United States Patent [19]
Keskes

[11] Patent Number: 5,268,994
[45] Date of Patent: Dec. 7, 1993

[54] METHOD OF PLOTTING SURFACES IN A 3D VOLUME

[75] Inventor: Naamen Keskes, Lons, France

[73] Assignee: Societe Nationale Elf Aquitaine (Production), Courbevoie, France

[21] Appl. No.: 647,994

[22] Filed: Jan. 30, 1991

[30] Foreign Application Priority Data

Jan. 30, 1990 [FR] France ................. 90 01051

[51] Int. Cl.$^5$ .................................. G06F 15/62
[52] U.S. Cl. .................................. 395/121; 395/141; 395/142
[58] Field of Search ............... 395/119, 127, 140, 141, 395/142, 143; 358/133, 140; 382/41

[56] References Cited

U.S. PATENT DOCUMENTS

| | | | |
|---|---|---|---|
| 2,329,721 | 9/1943 | Hoover, Jr. et al. | 367/55 |
| 4,772,946 | 9/1988 | Hammer | 358/133 |
| 4,807,298 | 2/1989 | Conte | 382/41 |
| 4,843,468 | 6/1989 | Drewery | 358/140 |

Primary Examiner—Mark K. Zimmerman
Attorney, Agent, or Firm—Birch, Stewart, Kolasch & Birch

[57] ABSTRACT

A method for plotting the surfaces in a 3D volume configured in the form of columns distributed over the nodes of a grid with the aid of 2D plotting algorithms by classifying the columns by way of a Peano-Hilbert curve.

6 Claims, 3 Drawing Sheets

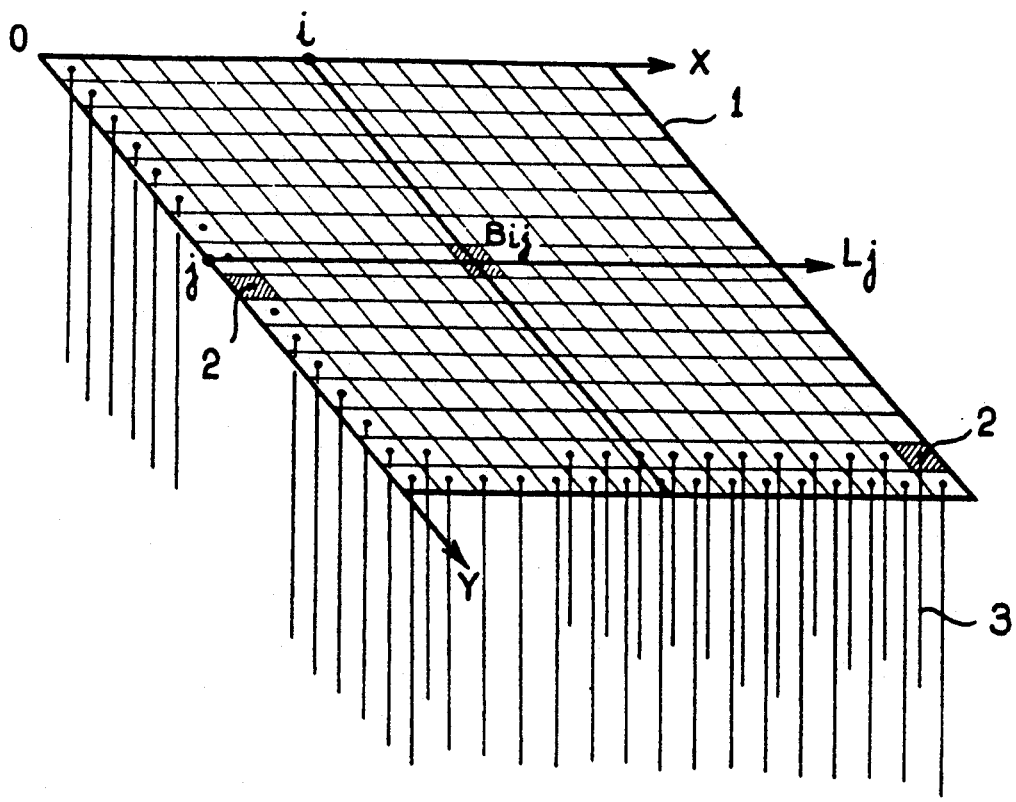
FIG_1
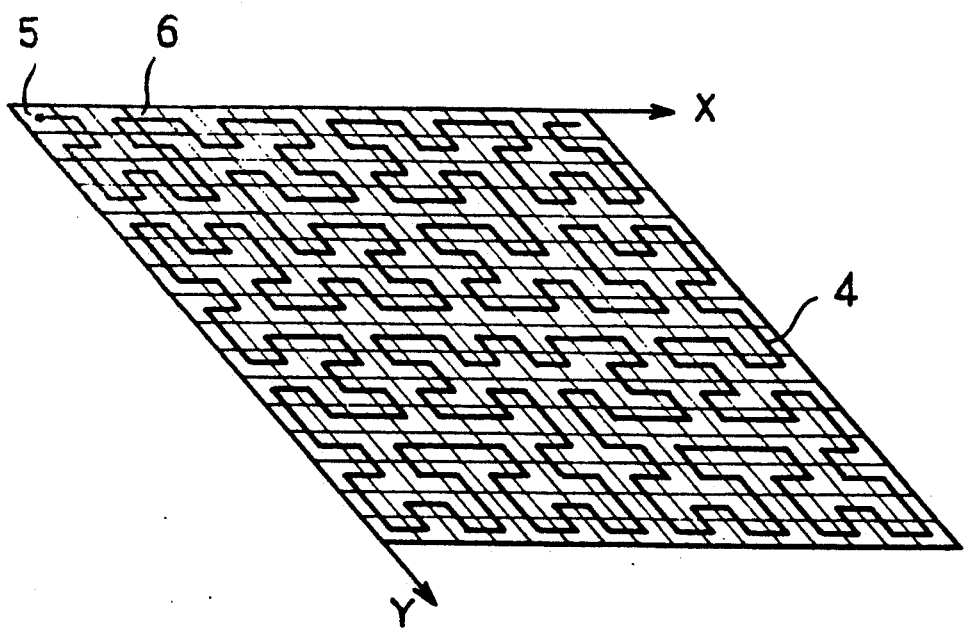
FIG_2

METHOD OF PLOTTING SURFACES IN A 3D VOLUME

BACKGROUND OF THE INVENTION

The invention relates to a method of plotting surfaces in a volume with three dimensions X, Y, Z, enabling the use of two-dimensional algorithms. Applied to seismology, this method enables in particular the reliable, semi-automatic mapping of seismic horizons in a region in which a 3D-recording program has been carried out and thus constitutes a valuable aid in the structural and stratigraphic interpretation of this region, for better oil exploration.

In many fields, there is a need to display and/or explore information contained in a volume. The great majority of techniques for exploration of such a volume of data consists in linearising so that the exploration of such a volume is carried out by way of the exploration of a set of planes or a set of complementary lines the union of which constitutes the volume.

Several linearisation techniques are known enabling the passage from an N-dimensional space to a space of lower dimension. Thus, the TV-scanning technique commonly used in the field of telecommunications or for tomography for example, enables the line-by-line description of a picture with two dimensions X, Y which is composed of a set of lines for which X is variable and Y constant.

In oil prospecting, geophysicists use a particular technique called "reflection seismology" which consists in emitting acoustic signals at ground level and in recording them after the said signals have been reflected at the borders between the various superimposed geological layers constituting the sub-soil and the topography of which it is desired to reconstruct. Two method-of acquiring these seismic recordings are mainly used. The first, a conventional method, consists in distributing emitters and receivers over a same surface line of X coordinates. This 2-dimensional method of acquisition enables a particular picture of the sub-soil, referred to as the seismic section, to be obtained, and which can be likened to a vertical cross-sectional plane of the sub-soil along the acquisition line, on which the borders between geological layers appear as sub-horizontal lineations. Each section consists of a succession of recordings sampled as a function of time or of depth Z, each representing the vertical situated directly below a point Pi with known coordinate Xi varying uniformly from one recording to the next. The exploration of these sections consists in carrying out a manual or automatic plotting of the various lineations.

The second method, up to now reserved essentially for studies of deposits presenting a structural problem, consists in distributing at ground level emitters and receivers distributed over a grid of coordinates X, Y in a horizontal plane. This type of acquisition, referred to as "3D acquisition", enables a three-dimensional picture of the sub-soil to be obtained, which picture consists of recordings sampled as a function of time or of depth Z, each representing the vertical directly below a point Pij with coordinates Xi, Yj varying uniformly from one recording to the next. To explore such a volume of 3D data, it has always been desired, in seismology, to reduce this to a conventional 2D-type acquisition so as to be able to use plotting or other tools and procedures developed for 2D-section exploration.

It is therefore considered that each 3D consists of a succession of parallel lines each associated with a constant Y, and which can be explored as an equal number of elementary 2D sections. The conventional interpretation of a 3D acquisition consists in carrying out a manual plotting of certain seismic horizons, in taking the times or depth of these horizons directly below each line and in mapping these horizons in horizontal cross-sectional planes with coordinates X, Y. There exist tools for so-called "automatic surface plotting of 3D horizons", such as "SPACE TRACK" ® developed by GSI, necessitating an interpretation post consisting of at least one microcomputer with memory and display screen. The tools enable the virtually instantaneous representation, from a volume of data stored in memory, of the seismic horizon surfaces manually plotted and digitised beforehand on the elementary 2D sections constituting the 3D acquisition. The use of tools for automatic plotting necessitates the linearisation of the 3D volume. The linearisations carried out up to now consist in juxtaposing the successive planes so as to obtain a seismic section of length equal to the sum of the lengths of the elementary sections constituting the data volume. Such a technique inspired by the scanning technique has the disadvantage in seismology that it introduces, on each passage from one plane to the next, a discontinuity which is manifested by a phase shift, which may be large, between the pictures of a same horizon. Now, the programs used for the exploration of seismic sections are very sensitive to phase shifts, in particular the reflector plotting programs which do not give satisfactory results in this case. The use of an inverted scanning technique consisting in describing each plane in a sense inverse to the previous one, enables discontinuities to be avoided, but introduces cusps at the uneven borders of planes to which the programs for interpretation, in particular for plotting, are also sensitive.

Another disadvantage of these techniques employed resides in the fact that the concept of neighbourhood does not exist insofar as the information relating to a given vertical is very distant, after linearisation, from the information relating to a vertical neighbouring the previous one but situated in a different plane. Taking account of the local context under these conditions is not possible, which can be very awkward if the result of the exploration of the data volume depends on regionally varying characteristics.

SUMMARY

The invention proposes a method enabling reliable plotting of surfaces in a volume and the use of 2D algorithms avoiding the inadequacies of the methods described above, by virtue of the transformation of the 3D volume into a 2D plane via the use of a Peano-Hilbert curve. This particular curve enables the whole of an area to be described without lifting the pen and while crossing only once each of the crossing points.

This curve is recursive, that is to say that it defines a pattern or key which repeats, thus ordering the space into contiguous sub-spaces.

The method, according to the invention, of plotting surfaces in a volume representing the values of a parameter sampled along three directions X, Y, Z and the extrema of which are preferentially organised along superimposed surfaces subparallel to a director plane of the volume so that the volume can be considered as consisting of a set of Z axis columns distributed over the nodes of a grid in the (X, Y) plane, is characterised in that, in a first step, from the Peano-Hilbert Key, the Peano-Hilbert curve adapted to the size of the grid and passing through all the nodes of the grid, is constituted according to the order defined by the Key. The one-to-one relationship R between the Peano order associated with the Peano-Hilbert curve and the coordinates Xi, Yi associated with each of the columns, is then established. With the aid of the relationship R, the columns are then reclassified according to the Peano order so as to transform the volume (X, Y, Z) into a picture with two dimensions (P, Z).

An automatic plotting program enabling the extrema correlating one column to the next to be connected by segments, is applied to the picture thus obtained and the inverse relationship $R^{-1}$ is applied to each of the segments so as to transform the segment into an elementary surface element. Finally, the surface elements thus obtained are displayed after having grouped them.

In a preferential way, in order to group the elementary surface elements, we proceed in the following way: after having sought all the elementary surface pairs having a common boundary but not overlapping, the surface elements having the largest boundary are grouped. The procedure consisting of the preceding operations is repeated as many times as possible and the surfaces thus obtained are displayed in order to validate them.

This method is particularly adapted to the plotting of seismic horizons on seismic traces recorded during a 3D seismic acquisition.

The plotting according to the method is not subordinated to a primor interpretation.

Besides a saving in time, the method avoids development of plotting tools specific to the plotting of 3D surfaces, on the one hand, and on the other hand, it enables the local context to be taken into account for the interpretation, and finally it enables reliable automation of the plotting.

BRIEF DESCRIPTION OF THE DRAWINGS

Other advantages of the method according to the invention will emerge on reading the following description of a particular application of the said method to the field of oil-prospecting seismology, and with the aid of the figures in which:

FIGS. 1 and 2 show, in a 3D volume consisting of columns, the order for selecting these columns on the basis of an adapted Peano-Hilbert curve.

DETAILED DESCRIPTION OF THE INVENTION

Reference is now made to the Figures.

The plane 1 of FIG. 1 represents schematically the acquisition plane of a 3D seismic study. This surface is conventionally partitioned into a set of rectangular surface elements of equal size commonly referred to as "bins", like the hatched surface (2). These bins are organised along two orthogonal directions X and Y and each bin is located as a function of its order number i along the X axis and its order number j along the Y axis, starting from an origin O. A vertical seismic trace like the trace (3) schematised by a line on FIG. 1, is associated with each bin Bi, j. Each trace obtained after a preliminary processing represents the acoustic response of ground vertical with the associated bin, sampled in uniform steps as a function of time or of depth.

The bins associated with a same order number j along the Y axis constitute a line Lj. With each line can be associated an elementary seismic section with two dimensions X, Z and consisting of the succession of traces associated with the bins constituting the line, classified by order number i in terms of increasing or decreasing X.

Figure 3:
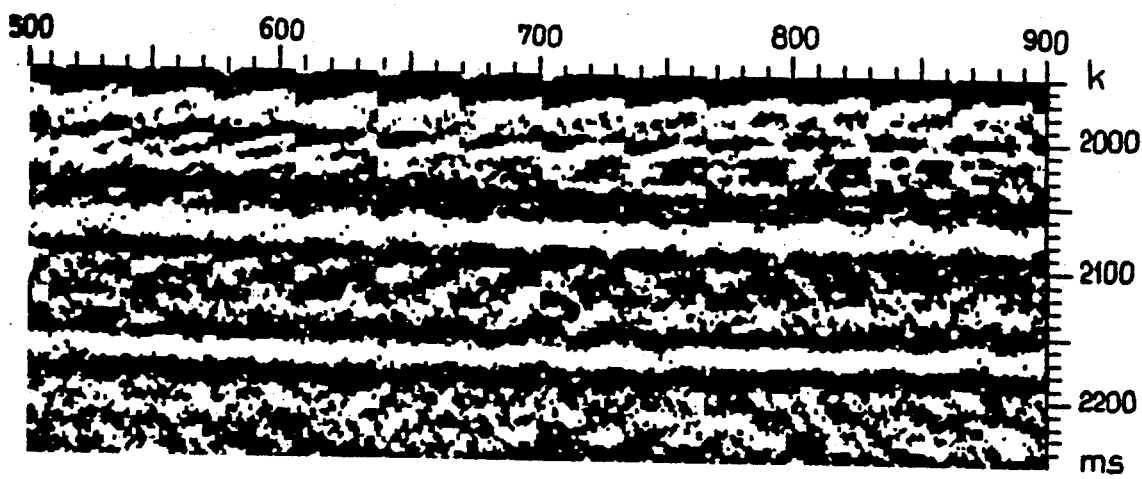
FIGS. 3, 4 show 2D time pictures obtained after unfolding the 3D volume following the conventional TV-scanning method and following the invention respectively.

FIG. 3 shows in an actual example, the result of the transformation of a 3D volume of seismic traces into an overall 2D section according to the conventional method consisting in juxtaposing one after the other and by increasing order number the elementary sections associated with the various lines of the volume. In FIG. 3, the various panels associated with distinct lines are perfectly distinguished, each crossing of one line to the next being marked by a strong discontinuity which are all the more visible the more sloped are the white or black striations visible on the sections.

No automatic plotting program currently known provides a result which can be used on this kind of overall section.

In the method, according to the invention, a volume is described, not line by line, but by following a Peano-Hilbert curve which is superimposed on the X, Y acquisition plane. This curve is constructed by repetition, according to a well-specified procedure, of a known single basic so-called "Peano-Hilbert Key" geometric pattern composed of basic straight segments oriented along one or other of two orthogonal directions. From such a pattern, a curve can be constructed enabling the passing through all the centers or nodes of a grid of arbitrary size and the passing through these only once. The repetition procedure consists in reproducing the basic key by replacing each basic segment by the key itself and so on and so forth. This procedure can be repeated again until a curve of sufficient size is obtained, comprising at least as many basic segments as bins, the two orthogonal directions of the key coinciding with the X and Y directions of the acquisition plane and the lengths of the basic segments being adapted to the size of the bins.

In FIG. 2 a curve 4 has been represented such a curve 4 adapted to the schematised volume of FIG. 1, which curve consists of the repetition of the Peano-Hilbert Key, itself consisting of the juxtaposition following a specific mode of basic segments oriented along the X or Y axes and of length equal to the size of the bins along the X axis, or Y axis respectively. As can be appreciated in FIG. 2, these continuous curves enable the passing through all the bins without lifting the pen, and the passing through these only once. It is therefore possible to define a one-to-one relationship R enabling a correspondence to be established between the indexing with two entries i, j of a bin in the reference frame (O, X, Y) and an indexing with a single entry index k corresponding to the order of encountering the bin when the Peano-Hilbert curve is followed starting from one of its ends. Thus, the bin 5, denoted $B_{1,1}$ according to the conventional indexation with two indices is transformed into $B_1$ according to the new indexation, and the bin 6 $B_{4,1}$ of FIG. 2 is transformed into $B_{16}$ since this bin is the sixteenth bin encountered when the curve is followed starting from the bin $B_1$. The application of this relationship R or of its inverse $R^{-1}$ enables continuous transformation of the two-dimensional space (O, X, Y) into a one-dimensional space (O, P), and a volume (O, X, Y, Z) into a plane (O, P, Z), or vice versa.

After having established the relationship R, the traces associated with each of the bins following the order defined by the new indexation R are juxtaposed. It can happen that no actual trace can be associated with a bin crossed by the Peano-Hilbert curve. In this case, the actual trace is replaced by a tight trace. A two-dimensional picture is then obtained like that represented in FIG. 4, composed of the same traces as FIG. 3 but arranged differently. Because of the tortuosities of the Peano-Hilbert curve, close points on the curve correspond to close points in space. This is why the discontinuities visible on each change of line in FIG. 3, have disappeared here. There cannot exist, in the two-dimensional image obtained by the method according to the invention, any large phase shift, due to the transformation of the 3D volume into a 2D plane, between one extremum or and point the picture from a particular reflector of the sub-soil on a trace, and the extremum of the same kind which is the picture from the same reflector on the neighbouring trace. A two-dimensional plotting program interconnecting the extrema of the same kind which can be correlated from one trace to the next, can therefore readily be applied to this type of 2D picture obtained in this way.

Figure 4:
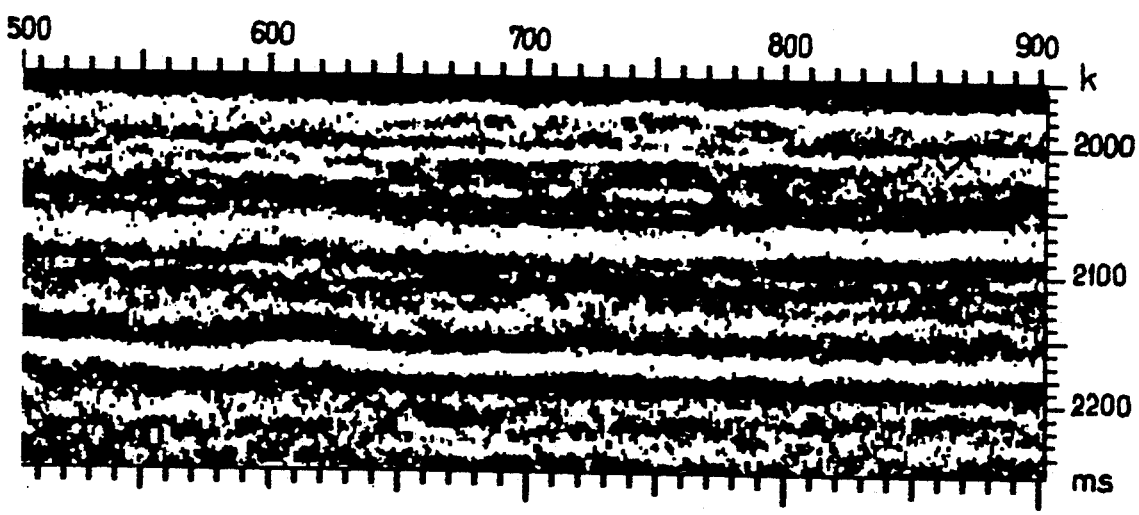

The result of the application of such a plotting, of which several known types exist, is the fact of a certain number of plotted lineations superimposing themselves on the white or black lineations visible to the eye on seismic sections and in FIG. 4 in particular. These lineations, the length of which varies with the continuity of the reflector, enable interconnection and grouping into a same subset, of the values of the amplitudes of the maxima or minima lying along each of the plotted lineations. With each plotted extremum is associated a time or a depth Z, an index k and parameters, like the amplitude. The application of the inverse transformation to such a plotted lineation enables repositioning of each plotted extremum in its actual position in the volume and thus definition of the elementary surface elements which could be displayed on a screen. Each lineation is in fact the unfolded intersection of a surface element of a continuous reflector with the succession of pieces of vertical planes the intersection of which with the acquisition plane (X, Y) superimposes with part of the Peano-Hilbert curve.

In order to limit erroneous correlations due to automatic plotting, a maximum threshold $\Delta Z$ can for example be imposed between the time or the depth of an extremum on a plotted lineation situated in a vertical with a bin $B_{i, j}$, and the extrema on the same lineation which are situated in a vertical with the eight bins surrounding the bin $B_{i, j}$. For each point of a plotted lineation in a vertical with a bin $B_{i, j}$, it is verified that the points of the same lineation in a vertical with the eight bins which surround the bin $B_{i, j}$ are not offset from the first by a value greater than a specified threshold, along the Z axis. If there exists an offset greater than the specified $\Delta Z$, the plotted lineation is broken at the level of the bin $B_{i, j}$. Such erroneous correlations manifest themselves for example on plotted displays of the surface or of the parameters associated with this surface by well-defined zones associated with colors or grey scales differing from the neighbouring zones.

Before displaying the elementary surface elements on a screen, they are grouped as much as possible. An example of a grouping mode consists in locating the elementary surface elements having a common boundary, but overlapping little or not at all, and associating these surface elements in pairs, one surface element being able to figure in several different pairs, so as to determine the pair having the longest common boundary. The two surface elements constituting this pair are then joined so as to constitute a new elementary surface element, and the procedure described above is repeated until it can no longer be done.

Figure 5:
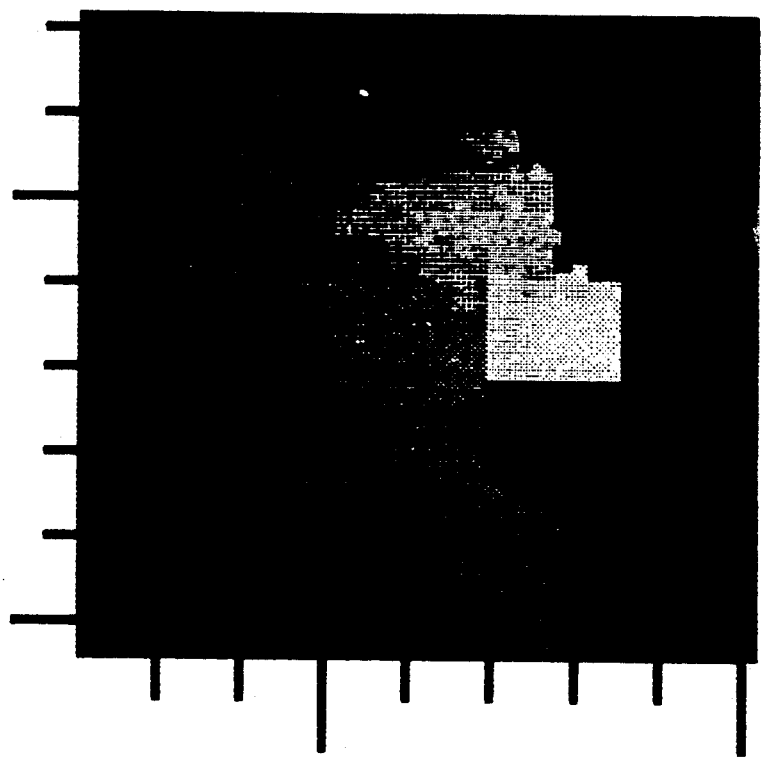
FIG. 5 represents, in horizontal cross-section, the surface of a seismic horizon after application of automatic plotting according to the invention.

The limitation in this method comes from its automatic procedure which necessitates the manual validation of the surfaces thus defined, for example by a fine analysis of the interpreter who returns by successive editing on the screen to the vertical planes or sections as soon as a plotting result seems to him/her locally anomalous. FIG. 5 shows a horizontal cross-section of such a surface, consisting of the union of several contiguous elementary surface elements The depth Z is grey-coded, the smallest values of depth corresponding to the lightest grey tints and the largest values to the darkest tints. There is very clearly distinguished on the eastern edge of this surface, which extends over a square of sides with eighty bins, an anomalous zone, which is lighter overall than the rest of the picture, which probably belongs to the reflector above the one which it was desired to display.

The plotting can be limited to partial volumes (for example 512 traces in X, by 512 traces in Y). All the seismic surfaces are plotted and computed. After computation, with the aid of a work station, the trace of the surfaces is displayed in any plane, and one of these traces can be chosen and identified by cursor. This automatic computation of all the different surfaces takes only a few minutes on normal configurations (for example a microcomputer of the HP350 type).

The detailed description above which bears upon the application of the method according to the invention to the study of a volume of seismic data does not limit the invention to this application alone. It is clearly evident that such a method according to the invention can be applied to any volume of data, other than seismic, sampled along three directions X, Y, Z, being organised along surfaces which it is desired to display.

Numerous variants are accessible to the expert, depending on the applications envisaged, without exceeding the scope of the invention.

I claim:

1. A method of plotting surfaces in a volume which represents values of a parameter sampled along three mutually orthogonal X, Y, Z axes and showing extrema organized along said surfaces, said values of the parameter being so distributed in said volume to form a set of Z axis columns over nodes of a grid defined in a plane parallel to the X, Y, axes, said method comprising the steps of:
   (a) generating a Peano-Hilbert curve adapted to pass through all the nodes of said grid such that said curve crosses each of said nodes only once;
   (b) establishing a one-to-one relationship R between a Peano order associated with the Peano-Hilbert curve and the coordinates of the nodes of the grid associated with each of said Z axis columns, said Peano order corresponding to an order of encountering the nodes when the Peano-Hilbert curve is followed starting from one of its ends;

(c) classifying the Z axis columns using said relationship R so as to transform said volume containing the columns into a two dimensional picture wherein said columns are juxtaposed according to the Peano order of their corresponding nodes;

(d) applying an automatic plotting program to said two dimensional picture enabling extrema correlating one column to the next to be connected in segments;

(e) performing an inverse relationship $R^{-1}$ on each of said segments to reposition each of the extrema located on each selected segment in its actual position in said volume and to transform said selected segment into a contour line which connects these extrema in said volume and limits an elementary surface element; and (f) grouping and displaying the elementary surface elements obtained by the transformation.

2. The method according to claim 1, wherein said Z axis columns are seismic traces recorded during a 3D seismic acquisition, and said seismic traces comprise extrema which are organized along surfaces representative of seismic horizons.

3. The method according to claim 1, wherein said extrema are organized along surfaces which are substantially parallel to a predetermined direction plane of said volume.

4. The surface-plotting method according to claim 1, wherein said step (f) of grouping and displaying the elementary surface elements further comprises the steps of:

(i) determining pairs of all elementary surface elements having a common non-overlapping boundary;

(ii) selecting among said pairs of elementary surface elements a pair which associates elementary surface elements having a longest common boundary and grouping the elementary surface elements of said selected pair;

(iii) repeating steps (i) and (ii) until it is no longer possible; and (iv) displaying said elementary surface elements for validation.

5. The method according to claim 4, wherein said Z axis columns are seismic traces recorded during a 3D seismic acquisition, and said seismic traces comprise extrema which are organized along surfaces representative of seismic horizons.

6. The method according to claim 4, wherein said extrema are organized along surfaces which are substantially parallel to a predetermined direction plane of said volume.

* * * * *